United States Patent
Hayashi

(10) Patent No.: US 8,723,993 B2
(45) Date of Patent: May 13, 2014

(54) IMAGING DEVICE AND STORAGE MEDIUM STORING AN IMAGING PROGRAM

(71) Applicant: FUJIFILM Corporation, Tokyo (JP)

(72) Inventor: Kenkichi Hayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/021,719

(22) Filed: Sep. 9, 2013

(65) Prior Publication Data

US 2014/0009649 A1    Jan. 9, 2014

Related U.S. Application Data

(63) Continuation of application No. PCT/JP2011/067545, filed on Jul. 29, 2011.

(30) Foreign Application Priority Data

Mar. 11, 2011 (JP) .................................. 2011-054632
Jul. 26, 2011 (JP) .................................. 2011-163307

(51) Int. Cl.
*H04N 9/68* (2006.01)
*H04N 3/14* (2006.01)
*H04N 5/335* (2011.01)

(52) U.S. Cl.
USPC ............................. 348/273; 348/238; 348/279

(58) Field of Classification Search
USPC .......................................... 348/238, 273, 279
See application file for complete search history.

(56) References Cited

U.S. PATENT DOCUMENTS

| | | | |
|---|---|---|---|
| 6,343,146 B1 | 1/2002 | Tsuruoka et al. | |
| 6,995,796 B2 | 2/2006 | Taubman | |
| 2002/0149686 A1 | 10/2002 | Taubman | |
| 2004/0109068 A1 | 6/2004 | Mitsunaga et al. | |
| 2004/0169747 A1 | 9/2004 | Ono et al. | |
| 2005/0270401 A1* | 12/2005 | Hatano | ......................... 348/335 |
| 2006/0203113 A1 | 9/2006 | Wada et al. | |
| 2007/0096011 A1 | 5/2007 | Sato et al. | |
| 2007/0153104 A1 | 7/2007 | Ellis-Monaghan et al. | |

(Continued)

FOREIGN PATENT DOCUMENTS

JP    8-23542 A    1/1996
JP    8-23543 A    1/1996

(Continued)

OTHER PUBLICATIONS

Notification of the First Office Action for CN 201180022503.3.

(Continued)

*Primary Examiner* — Joel Fosselman
(74) *Attorney, Agent, or Firm* — Birch, Stewart, Kolasch & Birch, LLP

(57) ABSTRACT

An imaging apparatus and image capture program are provided that enable an image processing section compatible with a Bayer array to be employed without modification even in cases in which an image pickup device is employed that is provided with a color filter of an array other than a Bayer array.

An imaging apparatus (10) is equipped with a color filter (30) having repeatedly disposed 6×6 pixel basic array patterns C containing a portion of a Bayer array pattern; and a drive section (22) that drives the image pickup device (14) so as to read pixel data only of pixels at a predetermined position so as to give the same pattern as the Bayer array pattern.

5 Claims, 12 Drawing Sheets

(56) References Cited

U.S. PATENT DOCUMENTS

| | | |
|---|---|---|
| 2008/0131028 A1 | 6/2008 | Pillman et al. |
| 2008/0151083 A1 | 6/2008 | Hains et al. |
| 2010/0328505 A1 | 12/2010 | Imamura |
| 2011/0069189 A1 | 3/2011 | Venkataraman et al. |
| 2012/0025060 A1 | 2/2012 | Iwata |

FOREIGN PATENT DOCUMENTS

| | | |
|---|---|---|
| JP | 10-243407 A | 9/1998 |
| JP | 11-285012 A | 10/1999 |
| JP | 2000-308080 A | 11/2000 |
| JP | 2004-221839 A | 8/2004 |
| JP | 2004-266369 A | 9/2004 |
| JP | 2005-136766 A | 5/2005 |
| JP | 2007-124295 A | 5/2007 |
| JP | 2007-184904 A | 7/2007 |
| JP | 2007-306490 A | 11/2007 |
| JP | 2008-78794 A | 4/2008 |
| JP | 2008-236620 A | 10/2008 |
| JP | 2009-246465 A | 10/2009 |
| JP | 2010-512048 A | 4/2010 |
| JP | 2010-153511 A | 7/2010 |
| JP | 2011-523538 A | 8/2011 |
| WO | WO 02/056604 A1 | 7/2002 |
| WO | WO 2008/066698 A2 | 6/2008 |
| WO | WO 2009/151903 A2 | 12/2009 |

OTHER PUBLICATIONS

International Search Report for PCT/JP2011/067545 mailed Sep. 6, 2011.
Written Opinion of the International Searching Authority for PCT/JP2011/067545 mailed Sep. 6, 2011.
Written Opinion of the International Searching Authority for PCT/JP2012/080898 mailed Jan. 22, 2013.
Written Opinion of the International Searching Authority for PCT/JP2012/080899 mailed Jan. 15, 2013.
Written Opinion of the International Searching Authority for PCT/JP2012/081644 mailed Jan. 15, 2013.
Written Opinion of the International Searching Authority for PCT/JP2012/083583 mailed Jan. 29, 2013.

* cited by examiner

FIG.3

TOTAL PIXELS [4896×3264] (3:2) 40

| R | G | R | G | R | G | R | G | R | G | R | G |
| G | B | G | B | G | B | G | B | G | B | G | B |
| R | G | R | G | R | G | R | G | R | G | R | G |
| G | B | G | B | G | B | G | B | G | B | G | B |
| R | G | R | G | R | G | R | G | R | G | R | G |
| G | B | G | B | G | B | G | B | G | B | G | B |
| R | G | R | G | R | G | R | G | R | G | R | G |
| G | B | G | B | G | B | G | B | G | B | G | B |
| R | G | R | G | R | G | R | G | R | G | R | G |
| G | B | G | B | G | B | G | B | G | B | G | B |
| R | G | R | G | R | G | R | G | R | G | R | G |
| G | B | G | B | G | B | G | B | G | B | G | B |

FIG.11A

ARRAY A   ARRAY B

| B | G | B | R | G | R | B | G | B | R | G | R |
|---|---|---|---|---|---|---|---|---|---|---|---|
| G | R | G | G | B | G | G | R | G | G | B | G |
| B | G | B | R | G | R | B | G | B | R | G | R |
| R | G | R | B | G | B | R | G | R | B | G | B |
| G | B | G | G | R | G | G | B | G | G | R | G |
| R | G | R | B | G | B | R | G | R | B | G | B |
| B | G | B | R | G | R | B | G | B | R | G | R |
| G | R | G | G | B | G | G | R | G | G | B | G |
| B | G | B | R | G | R | B | G | B | R | G | R |
| R | G | R | B | G | B | R | G | R | B | G | B |
| G | B | G | G | R | G | G | B | G | G | R | G |
| R | G | R | B | G | B | R | G | R | B | G | B |

IMAGING DEVICE AND STORAGE MEDIUM STORING AN IMAGING PROGRAM

CROSS-REFERENCE TO RELATED APPLICATIONS

This application is a continuation application of International Application No. PCT/JP2011/067545, filed Jul. 29, 2011, the disclosure of which is incorporated herein by reference in its entirety. Further, this application claims priority from Japanese Patent Application No. 2011-054632, filed Mar. 11, 2011, and Japanese Patent Application No. 2011-163307, filed Jul. 26, 2011.

BACKGROUND

1. Technical Field

The present invention relates to an imaging apparatus and an image capture program, and in particular to an imaging apparatus in which a single-chip color image pickup device is employed and to an image capture program of the same.

2. Related Art

Due to an output image of a single-chip color image pickup device being a RAW image (mosaic image), a multi-channel image is obtained by processing (synchronization processing) to interpolate missing color pixels from peripheral pixels. In such cases, sometimes there are problems with the reproduction characteristics of high frequency image signals. Due to aliasing being more liable to occur in captured images with a color image pickup device than with a black and white image pickup device, there is a need for higher resolution by increasing the reproducible region while suppressing moiré (false color) from occurring.

Patent Document 1 describes an imaging apparatus that performs thinning output with little generation of moiré and the like.

Moreover, Patent Document 2 describes an imaging apparatus that suppresses occurrence of moiré and lowers a color S/N ratio, and achieves higher resolution even with increased sensitivity by pixel mixing.

However, in a primary color type of Bayer array (see, for example, the Patent Document 3), that is the most widely employed color array in single-chip color image pickup devices, due to placing green (G) pixels, to which human eyes are most sensitive and that contribute most to obtaining a brightness signal, in a checkerboard pattern, with red (R) and blue (B) respectively placed in sequential lines, there are issues with reproduction precision when generating high frequency G signals in diagonal directions, and R, B signals in the horizontal direction and the vertical direction.

In order that such a problem does not occur, the use of color filters disposed with filters of each color in arrays other than Bayer arrays is contemplated (see, for example, Patent Document 4).

PATENT DOCUMENTS

Patent Document 1 Japanese Patent Application Laid-Open (JP-A) No. 2008-78794
Patent Document 2 JP-A No. 2009-246465
Patent Document 3 JP-A No. 2007-124295
Patent Document 4 JP-A No. 11-285012

In such cases, image processing such as for example synchronization processing needs to be performed as image processing corresponding to a new color filter array. However there is the issue that changing image processing according to the new color filter array is extremely complicated and increases greatly the number of design steps.

SUMMARY

The present invention addresses the above issue, and an objective thereof is to provide an imaging apparatus and image capture program that enable an image processing section compatible with a Bayer array to be employed without modification, even in cases in which an image pickup device is employed that is provided with a color filter of an array other than a Bayer array.

In order to address the above issue, an imaging apparatus of the present invention includes: an image pickup device including plural photoelectric conversion elements arrayed in a horizontal direction and a vertical direction; a color filter that is provided above plural pixels configured by the plural photoelectric conversion elements, the color filter having repeatedly disposed 6×6 pixel basic array patterns configured with a first array pattern and a second array pattern disposed symmetrically about a point, wherein the first array pattern is disposed on 3×3 pixels containing a portion of a Bayer array pattern disposed with a first filter corresponding to a first color that contributes most to obtaining a brightness signal placed on 2 pixels on one diagonal of a 2×2 pixel square array, and a second filter corresponding to a second color different from the first color and a third filter corresponding to a third color different from the first color and the second color respectively placed on 2 pixels of the other diagonal, and wherein the second array pattern has the same placement of the first filter as that in the first array pattern and has the placement of the second filter and the placement of the third filter swapped over to that of the first array pattern; a drive section that drives the image pickup device so as to read pixel data from the image pickup device only of pixels at a predetermined position so as to give the same pattern as the Bayer array pattern; and a generating section that, based on the pixel data of the Bayer array pattern output from the image pickup device, for each pixel generates pixel data for each color for each of the pixels by interpolating pixel data for colors other than the corresponding color from pixel data of peripheral pixels.

According to the invention, an image processing section compatible with a Bayer array can be employed without modification even in cases in which an image pickup device is employed equipped with a color filter of an array other than a Bayer array, due to providing the color filter containing a section of the same pattern as the Bayer array pattern and driving the image pickup device so as to read pixel data from the image pickup device only from pixels so as to give the same pattern as the Bayer array pattern.

Note that, configuration may be made such that the color filter is a color filter having repeatedly disposed 6×6 pixel basic array patterns configured with a first array pattern and a second array pattern disposed symmetrically about a point; the first array pattern has the first filter placed at the 4 corner and center pixels of a 3×3 pixel square array, the second filter placed in a line at the horizontal direction center of the square array, and the third filter placed in a line at the vertical direction center of the square array; and the second array pattern has the same placement of the first filter as that in the first array pattern and has the placement of the second filter and the placement of the third filter swapped over to that of the first array pattern.

Moreover, configuration may be made such that the color filter is a color filter having repeatedly disposed 6×6 pixel basic array patterns configured with a first array pattern and a second array pattern disposed symmetrically about a point;

the first array pattern has the third filter placed on pixels at the 4 corners of a 3×3 pixel square array, the second filter placed on the pixel at the center of the square array, and the first filter placed in a line at the vertical direction center and in a line at the horizontal direction center of the square array; and the second array pattern has the same placement of the first filter as that in the first array pattern and has the placement of the second filter and the placement of the third filter swapped over to that of the first array pattern.

Moreover, configuration may be made such that the first color is green (G), the second color is one color of red (R) or blue (B), and the third color is the other color of red (R) or blue (B).

An image capture program of the present invention is an image capture program that causes a computer to function as a drive section configuring the imaging apparatus.

Advantageous Effects of Invention

According to the present invention, the advantageous effect is exhibited of enabling an image processing section compatible with a Bayer array to be employed without modification, even in cases in which an image pickup device is employed that is provided with a color filter of an array other than a Bayer array.

BRIEF DESCRIPTION OF DRAWINGS

FIG. 3 is a configuration diagram of a Bayer array pattern color filter

FIG. 11A is a diagram illustrating a color filter in which 6×6 pixel basic array patterns contained in a color filter according to a fourth exemplary embodiment are split into 3×3 pixel arrays A and arrays B that are repeatedly disposed along a horizontal direction and a vertical direction.

DESCRIPTION OF EMBODIMENTS

Explanation follows regarding exemplary embodiments of the present invention, with reference to the drawings.

First Exemplary Embodiment

Figure 1:
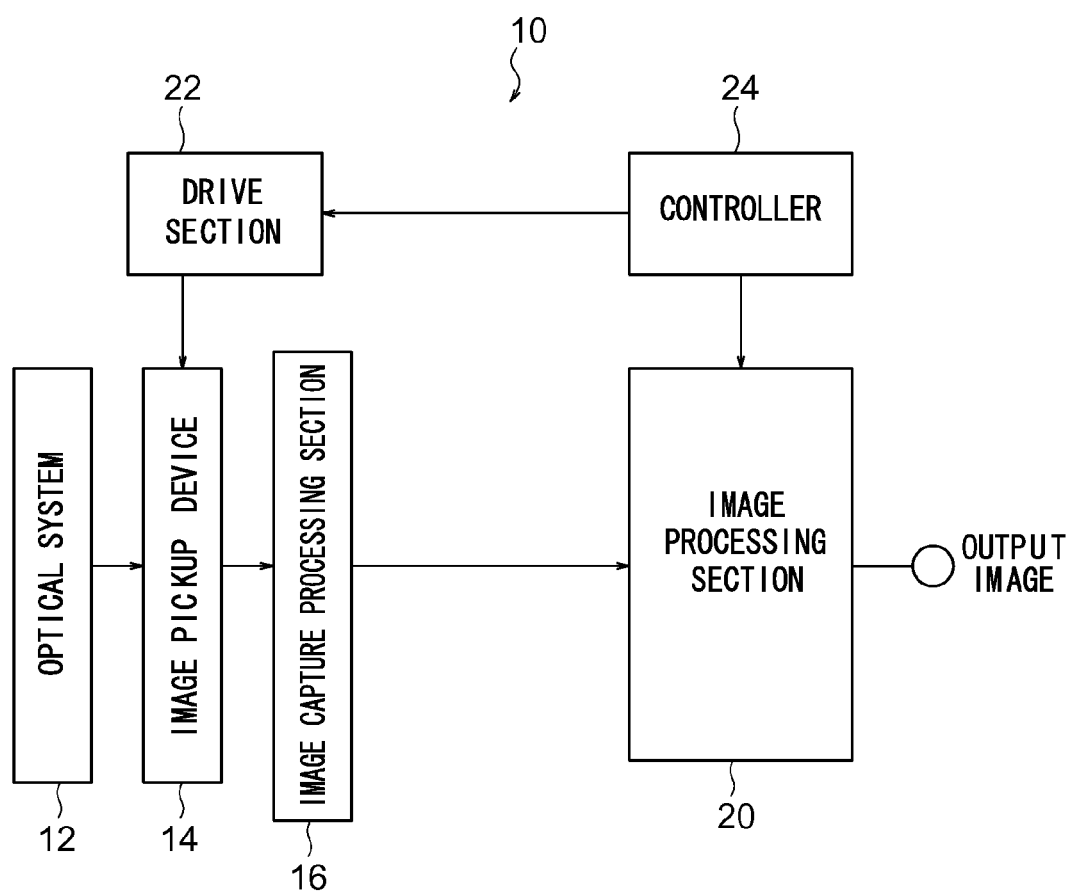
FIG. 1 is a schematic block diagram of an imaging apparatus.

FIG. 1 is a schematic block diagram illustrating an imaging apparatus 10 according to the present exemplary embodiment. The imaging apparatus 10 is configured including an optical system 12, an image pickup device 14, an image capture processing section 16, an image processing section 20, a drive section 22, and a controller 24.

The optical system 12 is configured including for example a lens set configured from plural optical lenses, an aperture adjustment mechanism, a zoom mechanism, and an automatic focusing mechanism.

The image pickup device 14 is what is referred to as a 1-chip image pickup device configured by an image pickup device, such as for example a Charge Coupled Device (CCD) or a Complementary Metal Oxide Semiconductor (CMOS) containing plural photoelectric conversion elements arrayed in the horizontal direction and vertical direction, with a color filter disposed above the image pickup device.

Figure 2:
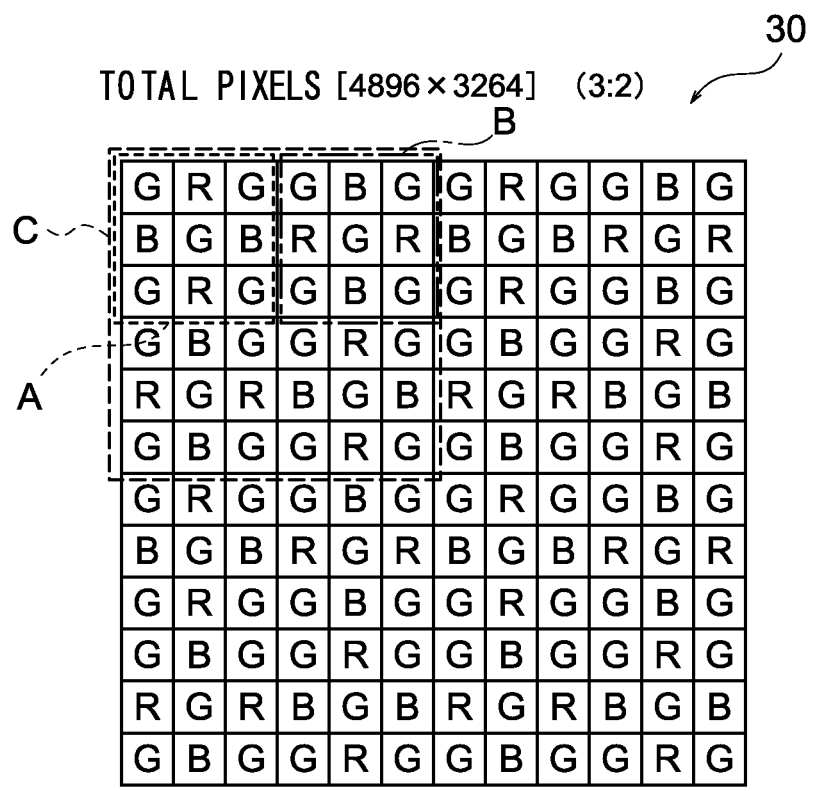
FIG. 2 is a configuration diagram of a color filter according to the present invention.

FIG. 2 illustrates a portion of a color filter 30 according to the present invention. Note that (4896×3264) pixels are provided as an example of the number of pixels with an aspect ratio of 3:2, however there is no limitation to such a number of pixels and aspect ratio. As illustrated in the drawing, the color filter 30 is a color filter having a repeatedly disposed 6×6 pixel basic array pattern C configured with a first array pattern A and a second array pattern B disposed symmetrically about a point, wherein the first array pattern A has a first filter G (referred to below as G filter) corresponding to G (green) that contributes most to obtaining a brightness signal placed at the 4 corner and center pixels of a 3×3 pixel square array, a second filter R (referred to below as R filter) corresponding to R (red) placed in the line at the horizontal direction center of the square array, and a third filter B (referred to below as B filter) corresponding to B (blue) placed in the line at the vertical direction center of the square array, and the second array pattern B has the same placement of the G filter as that of the first array pattern A and has the placement of the R filter and the placement of the B filter swapped over thereto.

Namely, the color filter 30 has the following features (1), (2), (3), (4) and (5).

Feature (1)

The color filter 30 illustrated in FIG. 2 includes the basic array pattern C formed from square placement patterns corresponding to 6×6 pixels, with the basic array pattern C disposed so as to repeat in both the horizontal direction and the vertical direction. Namely, the color filter array is an array in which each of the filters R, G, B (the R filter, G filter, B filter) has a specific periodicity.

Arraying the R filter, G filter and B filter thus with such a specific periodicity, enables processing to be performed in a repeating pattern such as during synchronization (interpolation) processing of R, G, B signals read from the color image pickup device.

Moreover, when images are reduced by thinning processing in basic array pattern C units, the color filter array of the thinning processed reduced image can be made similar to the color filter array prior to thinning processing, enabling a common processing circuit to be employed.

Feature (2)

The color filter 30 illustrated in FIG. 2 has the G filter, that corresponds to the color contributing the most to obtaining a brightness signal (the color G in the present exemplary embodiment), placed in each line in the horizontal direction, vertical direction and diagonal directions of the color filter array.

The G filter corresponding to the brightness system pixels are placed in every line in the horizontal direction, vertical direction and diagonal directions of the color filter array, thereby enabling the reproduction precision of synchronization processing to be raised in the high frequency region, irrespective of the high frequency direction.

Feature (3)

In the color filter 30 illustrated in FIG. 2, the R filter and B filter, that correspond to the two or more other colors than the G color (the R and B colors in the present exemplary embodiment), are placed in each line in the horizontal direction and vertical direction of the color filter array.

The R filter and B filter are placed in each line in the horizontal direction and vertical direction of the color filter array, thereby enabling color moiré (false color) generation to be suppressed. Thus an optical low pass filter for suppressing false color generation may be omitted from placement on the optical path of the optical system from the incident face to the imaging plane. Moreover, even in cases in which an optical low pass filter is applied, one can be employed that has a weak action to cut the high frequency components to prevent false color generation, enabling deterioration of resolution to be avoided.

The basic array pattern C such as illustrated in FIG. 2 can be considered as an array of alternate first array pattern A and second array pattern B in the horizontal direction and vertical direction, wherein the first array pattern A is the 3×3 pixels surrounded by the frame of the broken line, and the second array pattern B is the 3×3 pixels surrounded by the frame of the single dot intermittent line.

The first array pattern A and the second array pattern B both have the G filters for the respective brightness system pixels placed at their 4 corners and center, so as to be placed along their two diagonals. Moreover, in the first array pattern A, the B filters are arrayed in the horizontal direction on each side of the central G filter, and the R filters are arrayed in the vertical direction. However, in the second array pattern B, the R filters are arrayed on each side of the central G filter in the horizontal direction, and the B filters are arrayed in the vertical direction. Namely, the first array pattern A and the second array pattern B have reverse positional relationships for the R filters and the B filters, but have the same placement otherwise.

Figure 8:
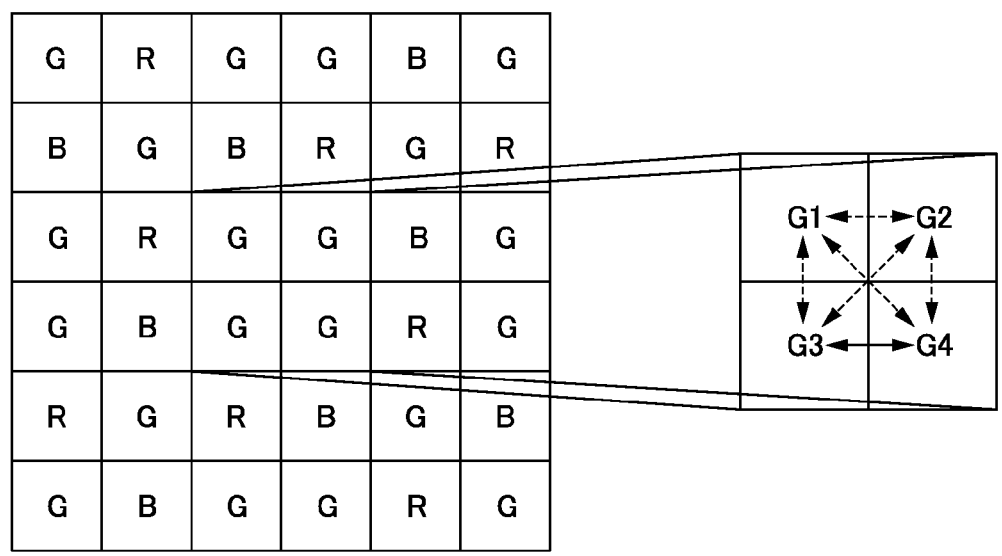
FIG. 8 is diagram to explain a method of determining a correlation direction from pixel values of G pixels of 2×2 pixels contained in a color filter.

Moreover, the G filters at the 4 corners of the first array pattern A and the second array pattern B configure G filters that are arrayed in a square array corresponding to 2×2 pixels by disposing the first array pattern A and the second array pattern B alternately along the horizontal and vertical directions as illustrated in FIG. 8.

Feature (4)

The color filter 30 illustrated in FIG. 2 contains a square array corresponding to 2×2 pixels formed from the G filters.

As illustrated in FIG. 8, by extracting the 2×2 pixels formed from the G filters, and deriving the difference in absolute value of the pixel values of the G pixels in the horizontal direction, the difference in absolute value of the pixel values of the G pixels in the vertical direction, and the difference in absolute value of the pixel values of the G pixels in the diagonal directions (sloping up to the right and sloping up to the left), determination can be made that there is correlation in the direction with the smallest difference in absolute value out of the horizontal direction, vertical direction and diagonal directions.

Namely, according to the color filter array, the data of the G pixels with the smallest inter pixel separations are employed, thereby enabling determination of the direction with the highest correlation out of the horizontal direction, vertical direction and diagonal directions. The result of this directional determination can then be employed in interpolation processing from the peripheral pixels (synchronization processing).

Feature (5)

The basic array pattern C of the color filter 30 illustrated in FIG. 2 has point symmetry about the center of the basic array pattern C (the center of the 4 G filters). Moreover, as illustrated in FIG. 2, the first array pattern A and the second array pattern B inside the basic array pattern C also each have respective point symmetry about the G filters at their respective centers.

Such symmetry enables the circuit scale of a later stage processing circuit to be made smaller and to be simplified.

Figure 9:
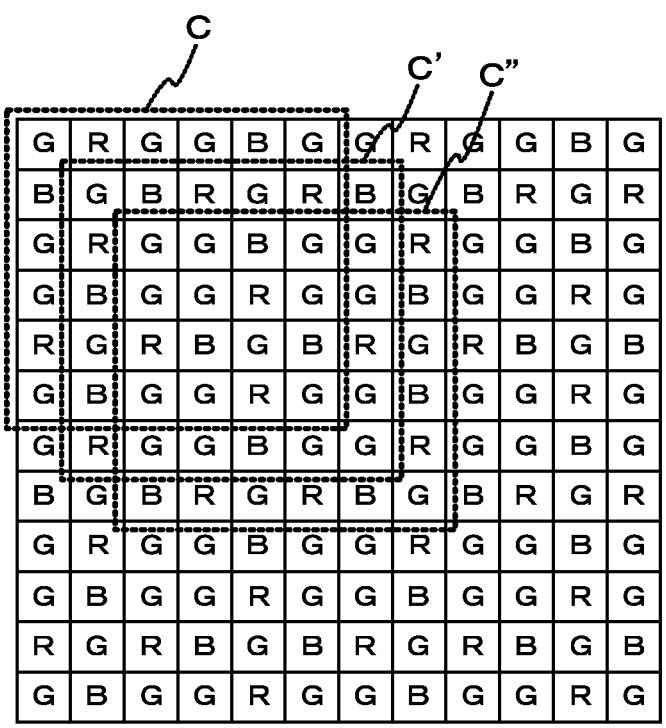
FIG. 9 is diagram to explain principles of a basic array pattern contained in a color filter.

In the basic array pattern C as illustrated in FIG. 9, the color filter arrays of the first and third lines out of the first to sixth horizontal direction lines are GRGGBG, the color filter array of the second line is BGBRGR, the color filter arrays of the fourth and sixth lines are GBGGRG, and the color filter array of the fifth line is RGRBGB.

In FIG. 9, taking a shifted basic array pattern C' as the basic array pattern C shifted respectively by 1 pixel each in the horizontal direction and vertical direction, and a shifted basic array pattern C" shifted respectively by 2 pixels each, then the same color filter array results from repeatedly disposing the basic array pattern C', C" along the horizontal direction and vertical direction.

Namely, plural basic array patterns exist that enable configuration of the color filter array illustrated in FIG. 9 by repeatedly disposing basic array patterns in the horizontal direction and vertical direction. In the present exemplary embodiment, the basic array pattern C that is the basic array pattern with point symmetry is, for convenience, referred to as the basic array pattern.

Figure 10:
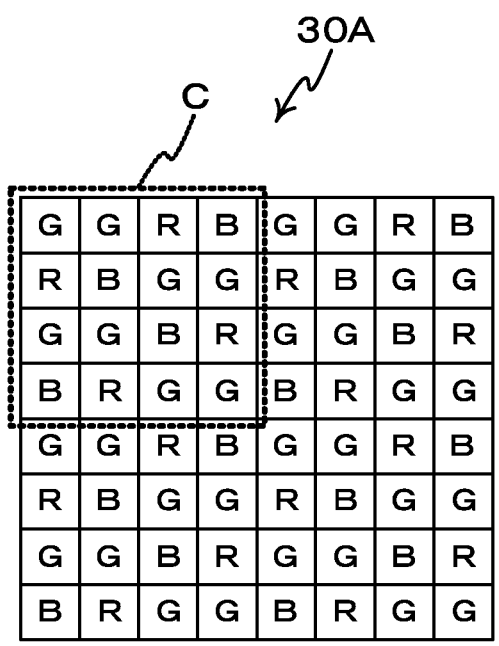
FIG. 10 is a diagram illustrating a modified example of a color filter.

FIG. 10 is a diagram illustrating a modified example of a color filter according to the present exemplary embodiment. A color filter 30A illustrated in FIG. 10 contains a basic array pattern C configured from square array patterns corresponding to 4×4 pixels, with the basic array pattern C disposed repeating in a horizontal direction and a vertical direction.

The color filter 30A, similarly to the color filter 30 illustrated in FIG. 2, has G filters placed in each line in the horizontal direction, vertical direction and diagonal directions of the color filter array, and with R filters and B filters placed in each line in the horizontal and vertical directions in the color filter array.

Moreover, the basic array pattern C has point symmetry about the center of the basic array pattern C.

However, although the color filter 30A does not include a square array corresponding to 2×2 pixels configured from G filters, the color filter 30A includes horizontal direction adjacent G filters and includes diagonal direction (bottom left to top right diagonal and top left to bottom right diagonal) adjacent G filters.

In the vertical direction, due to the presence of R filters or B filters interposed between G filters, the pixel values of the G pixels corresponding to these G filters can be employed when determining vertical direction correlation.

The color filter 30A described above has the same features as the features (1), (2), (3) and (5) of the color filter 30 illustrated in FIG. 2.

In contrast thereto, a section of a Bayer array color filter 40 is illustrated in FIG. 3. Note that the color filter illustrated in FIG. 3 is also an example in which the pixel number is (4896×3264) pixels, and the aspect ratio is 3:2. As illustrated in FIG. 3, the Bayer array color filter 40 is configured with G filters placed on 2 pixels on one of the diagonals of a square array of 2×2 pixels, and with an R filter and a B filter respectively placed on the 2 pixels of the other diagonal.

The image capture processing section 16 performs predetermined processing such as amplification processing, correlation double sampling processing and A/D conversion processing on image capture signals output from the image pickup device 14, and then outputs these as pixel data to a pixel conversion processing section 18.

The image processing section 20 subjects the pixel data that has been output from the image capture processing section 16 to what is referred to as synchronization processing. Namely, for all the pixels, interpolation is performed of pixel data for colors other than the corresponding respective color from pixel data of peripheral pixels, so as to generate R, G, B pixel data for all pixels. Then, what is referred to as YC conversion processing is performed to the generated R, G, B pixel data, to generate brightness data Y and color difference data Cr, Cb. Then resizing processing is performed to re-size these signals to a size according to the image capture mode. Note that the image processing section 20 performs processing corresponding to Bayer array pattern pixel data.

The drive section 22 performs for example driving to read image capture signals from the image pickup device 14 according to instruction from the controller 24.

The controller 24 performs overall control of the drive section 22 and the image processing section 20 according to the image capture mode. Although discussed in detail later, put briefly the controller 24 instructs the drive section 22 to read image capture signals with a reading method corresponding to the image capture mode, and instructs the image processing section 20 to perform image processing corresponding to the image capture mode.

Since, depending on the image capture mode, there is a need to read thinned image capture signals from the image pickup device 14, the controller 24 instructs the drive section 22 so as to thin and read image capture signals using a thinning method corresponding to the instructed image capture mode.

In the present exemplary embodiment, explanation is given as an example of an image capture mode of an example of processing in cases set with an HD video mode that thins a captured image and generates High Definition (HD) video data at a comparatively high resolution and records this on a recording medium such as a memory card, not illustrated in the drawings, and a through video mode in which a captured image is thinned and a through video of comparatively low resolution is output to a display section, not illustrated in the drawings.

Figure 4:
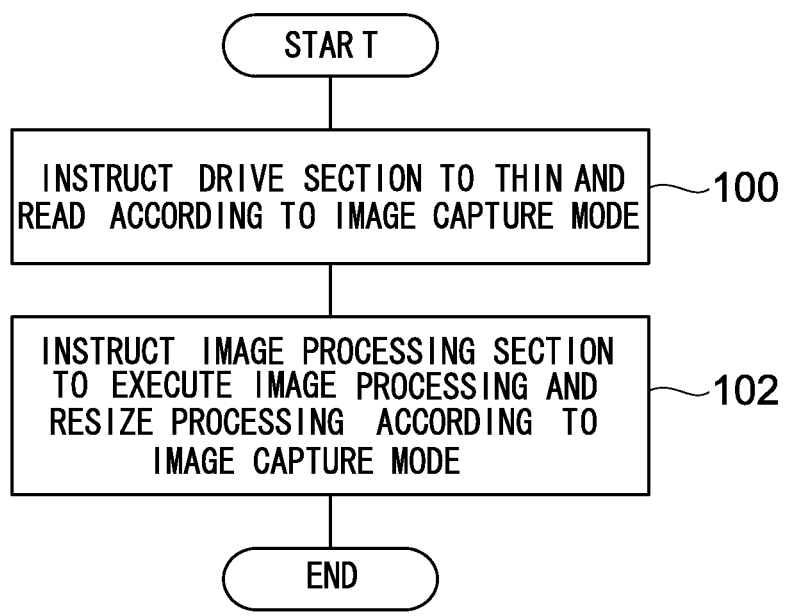
FIG. 4 is a flow chart of processing executed in a controller.

Explanation next follows of operation of the present exemplary embodiment, regarding processing executed by the controller 24, with reference to the flow chart of FIG. 4.

Note that the processing illustrated in FIG. 4 is executed when execution of imaging corresponding to the image capture mode is instructed.

First, at step 100, the drive section 22 is instructed to read pixel data by a thinning method corresponding to the image capture mode.

At step 102, the image processing section 20 is instructed to execute Bayer processing (synchronization processing and YC conversion processing) and resizing processing corresponding to the image capture mode.

Note that the controller 24 may be configured with a computer that includes a CPU, ROM, RAM and non-volatile ROM. In such cases a processing program for the above processing may, for example, be pre-stored on the non-volatile ROM, and then executed by reading into the CPU.

Explanation follows regarding a specific example of thinning and reading.

As illustrated in FIG. 2, the first array pattern A and the second array pattern B include a section with a Bayer array pattern. For example, since G pixels are placed on diagonals of the first array pattern A, and R pixels and B pixels are placed elsewhere, when any given 2×2 pixels from the first array pattern A are viewed in isolation these are the same as the 2×2 pixel Bayer array pattern illustrated in FIG. 3. This also applies to the second array pattern B.

Consequently, in the present exemplary embodiment, when thinning and reading, the image pickup device 14 is driven so as to read only pixel data of pixels with the same pattern as the Bayer array pattern of the color filter 30.

Figure 5:
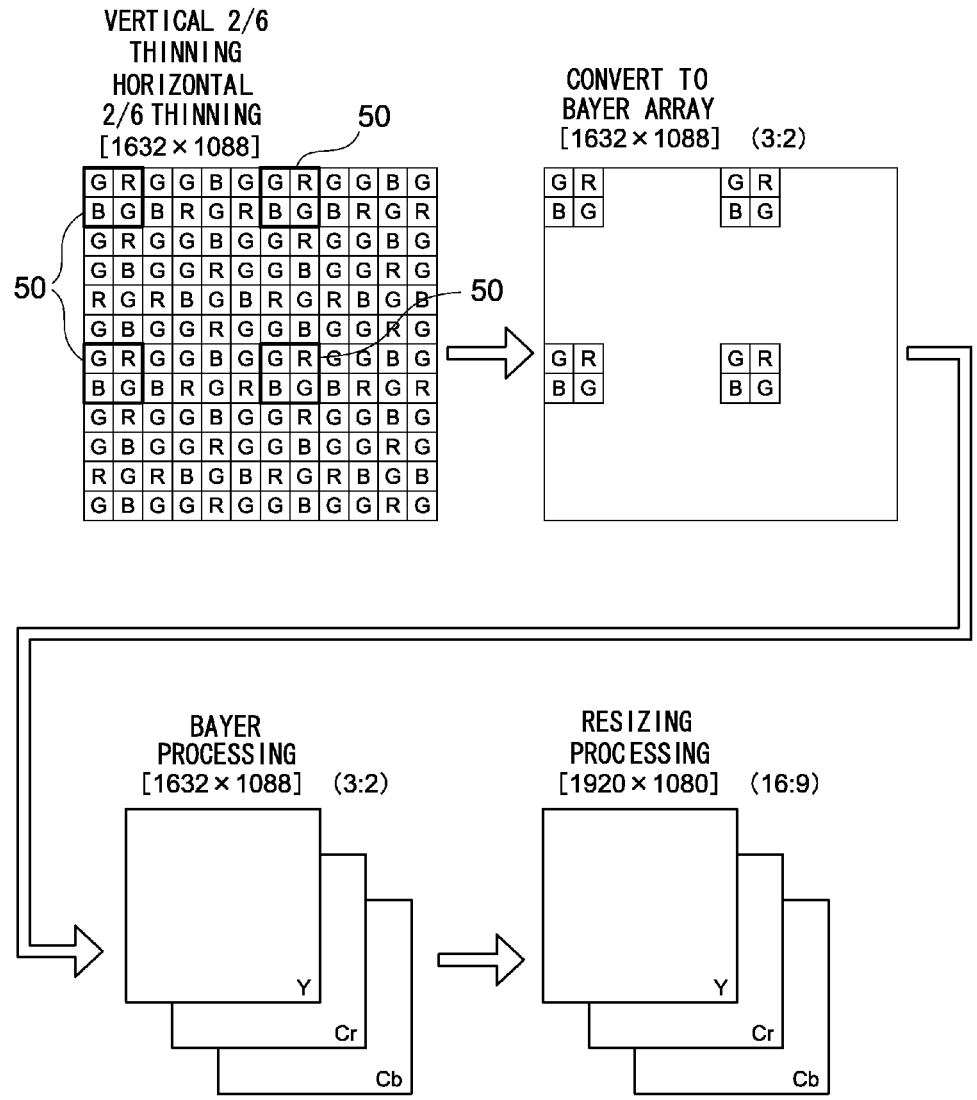
FIG. 5 is a diagram to explain a flow of thinning processing according to a first exemplary embodiment.

A flow of processing of a case of image capture by HD video mode is schematically illustrated in FIG. 5. In the present exemplary embodiment, as illustrated at the top left of FIG. 5, the controller 24 instructs the drive section 22 so as to read pixel data of the $(6n+1)^{th}$ (n=0, 1, 2, and so on) and $(6n+2)^{th}$ (n=0, 1, 2, and so on) vertical direction and horizontal direction lines. Thereby, pixel data is only output from the image pickup device 14 from 2×2 pixels inside frames 50 at the top left of FIG. 5. Consequently, pixel data for a pixel number (1632×1088) is output from the image pickup device 14. Since the 2×2 pixels inside the frames 50 configure a Bayer array, the pixel data output from the image pickup device 14 is naturally a Bayer array as illustrated at the top right of FIG. 5.

Thus, even in cases in which a color filter 30 is employed that differs from a Bayer array pattern, due to only reading pixels with the same pattern as a Bayer array pattern, the pixel data output from the image pickup device 14 does not need to be converted into a Bayer array pattern, thereby enabling simplification of the apparatus configuration. Moreover, the image processing section 20 corresponding to a Bayer array can be employed at a later stage without requiring conversion for use with the color filter 30.

In the image processing section 20, Bayer processing (synchronization processing and YC conversion processing) is executed as illustrated at the bottom left of FIG. 5, after which resizing processing corresponding is executed as illustrated at the bottom right of FIG. 5. As an example, at the bottom right of FIG. 5, resizing to a size of (1920×1080) is performed. The resized image is then output.

Second Exemplary Embodiment

Explanation next follows regarding a second exemplary embodiment of the present invention. Note that similar portions to the above exemplary embodiment are allocated the same reference numerals and detailed explanation thereof is omitted.

The present exemplary embodiment differs from the first exemplary embodiment in the image capture mode, and is similar to the first exemplary embodiment in other respects.

In the present exemplary embodiment, thinning is similar to that of the first exemplary embodiment, and similarly to as illustrated at the top left of FIG. 5, the controller 24 instructs the drive section 22 so as to read pixel data of the pixels at the positions of intersections of the $(6n+1)^{th}$ (n=0, 1, 2, and so on) and $(6n+2)^{th}$ (n=0, 1, 2, and so on) vertical direction and horizontal direction lines. Consequently, pixel data for a Bayer array, as illustrated at the top right of FIG. 5 are output from the image pickup device 14.

In the image processing section 20, Bayer processing is executed similar to that illustrated at the bottom left of FIG. 5, and then resizing processing is executed. In the present exemplary embodiment, since the through video mode is employed, resizing is performed to a size smaller than in the HD video mode, for example to a size of (640×480). The resized image is then output.

Third Exemplary Embodiment

Explanation next follows regarding a third exemplary embodiment of the present exemplary embodiment. Note that similar portions to the above exemplary embodiment are allocated the same reference numerals and detailed explanation thereof is omitted.

The present exemplary embodiment differs from the first exemplary embodiment in the image capture mode and the method of thinning, and is similar to the first exemplary embodiment in other respects.

Figure 6:
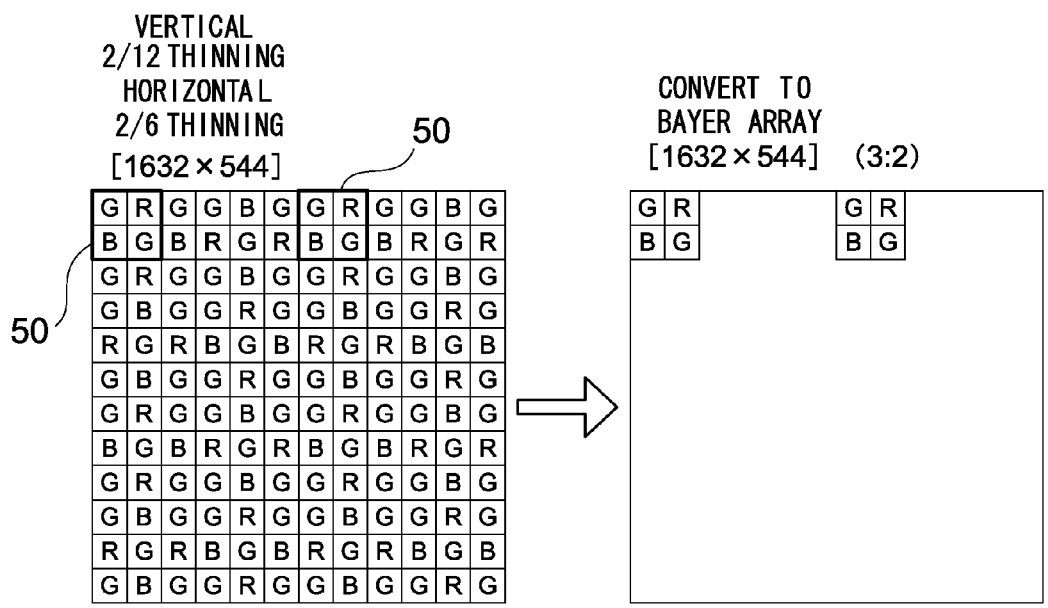
FIG. 6 is diagram to explain a flow of thinning processing according to a third exemplary embodiment.

A flow of processing of a case of image capture by through video mode is schematically illustrated in FIG. 6. In the present exemplary embodiment, as illustrated at the left of FIG. 6, the controller 24 instructs the drive section 22 so as to read pixel data of pixels at positions where the $(12n+1)^{th}$ (n=0, 1, 2, and so on) and $(12n+2)^{th}$ (n=0, 1, 2, and so on) vertical direction lines intersect with the $(6n+1)^{th}$ (n=0, 1, 2, and so on) and $(6n+2)^{th}$ (n=0, 1, 2, and so on) horizontal direction lines. Thereby, pixel data is only output from the image pickup device 14 from 2×2 pixels inside frames 50 at the left of FIG. 6. Consequently, pixel data for a pixel number (1632×544) is output from the image pickup device 14. Since the 2×2 pixels inside the frames 50 configure a Bayer array, the pixel data output from the image pickup device 14 is naturally a Bayer array as illustrated at the right of FIG. 6.

In the image processing section 20, although omitted from illustration in FIG. 6, Bayer processing (synchronization processing and YC conversion processing) is executed similarly to as in the first exemplary embodiment, and then resizing processing is executed similarly to as in the first exemplary embodiment. However, in the present exemplary embodiment, since the through video mode is employed, resizing is performed to a size smaller than in the HD video mode, for example to a size of (640×480). The resized image is then output.

Fourth Exemplary Embodiment

Explanation next follows regarding a fourth exemplary embodiment of the present invention. Note that similar portions to the above exemplary embodiment are allocated the same reference numerals and detailed explanation thereof is omitted.

Figure 7:
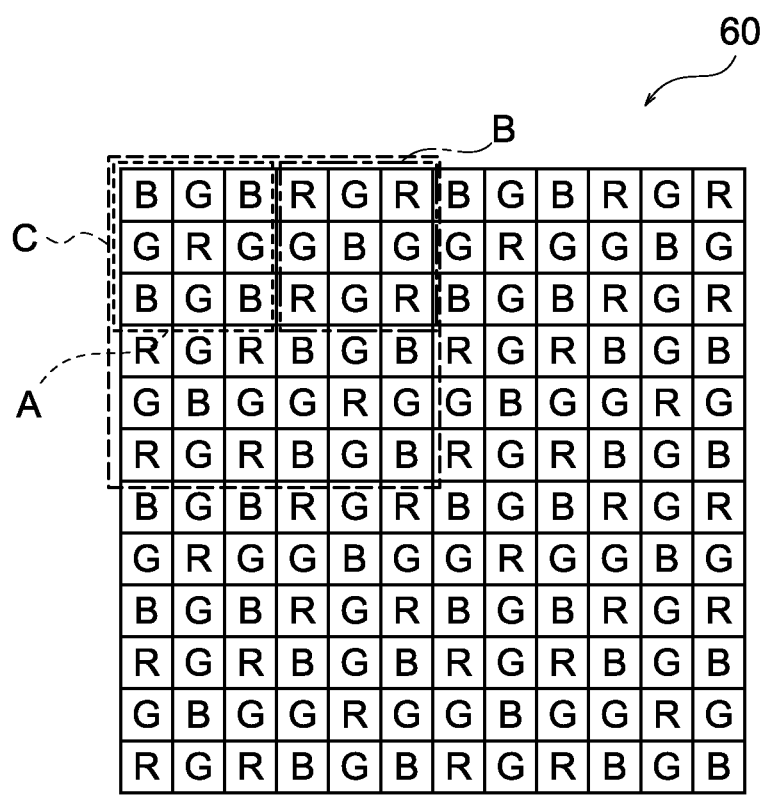
FIG. 7 is a diagram illustrating a modified example of a color filter.

In the present exemplary embodiment explanation is given of a modified example of a color filter. FIG. 7 illustrates a color filter 60 according to a modified example. Note that (4896×3264) pixels are provided as an example of the number of pixels with an aspect ratio of 3:2, however there is no limitation to such a number of pixels and aspect ratio.

As illustrated in FIG. 7, the color filter 60 is a color filter having a repeatedly disposed 6×6 pixel basic array pattern C configured with a first array pattern A and a second array pattern B disposed symmetrically about a point, wherein the first array pattern A has a B filter placed at the 4 corner pixels of a 3×3 pixel square array, an R filter placed at the center pixel of the square array, and a G filter placed in the line at the vertical direction center of the square array and placed in the line at the horizontal direction center of the square array, and the second array pattern B has the same placement of the filter G as that of the first array pattern A and has the placement of the filter R and the placement of the B filter swapped over thereto.

Namely, the color filter 60 has the feature (1) explained with respect to the first exemplary embodiment, and the following features (6), (7) and (8).

Feature (6)

The basic array pattern C configuring the color filter 60 illustrated in FIG. 7 has one or more of a G filter, corresponding to the color that contributes most to obtaining a brightness signal (the G color in the present exemplary embodiment), and of a R filter and of a B filter, corresponding to colors other than the G color (to R, B in the present exemplary embodiment), placed in each horizontal and vertical direction line in the basic array pattern C.

The R, G, B filters are placed in each horizontal and vertical direction line in the respective basic array patterns C, thereby enabling color moiré (false color) generation to be suppressed. Thus placement of an optical low pass filter for suppressing false color generation on the optical path of the optical system from the incident face to the imaging plane may be omitted. Moreover, even in cases in which an optical low pass filter is applied, one can be employed that has a weak action to cut the high frequency components to prevent false color generation, enabling deterioration of resolution to be avoided.

Feature (7)

The G filters corresponding to the brightness system pixels are placed so as to include portions with 2 or more adjacent G filters in each of the horizontal, vertical and diagonal directions in the basic array pattern C.

The basic array pattern C as illustrated in FIG. 7 may be considered as an array of alternate first array pattern A and second array pattern B arranged in the horizontal direction and the vertical direction, wherein the first array pattern A is the 3×3 pixels surrounded by the frame of the broken line, and the second array pattern B is the 3×3 pixels surrounded by the frame of the single dot intermittent line.

In the first array pattern A, the R filter is placed at the center, the B filter is placed at the 4 corners, and the G filter is placed at the top and bottom and left and right on either side of the central R filter. However, in the second array pattern B, the B filter is placed at the center, the R filter is placed at the 4 corners, and the G filter is placed at the top and bottom and left and right on either side of the central B filter. The first array pattern A and the second array pattern B have opposite positional relationships for the R filter and the B filter, however other placements are the same.

Moreover, as illustrated in FIG. 11A, the color filter according to the present exemplary embodiment may be considered as an alternate horizontal direction and vertical direction array of the above first array pattern A (array A) and the above second array pattern B (array B).

Figure 11B:
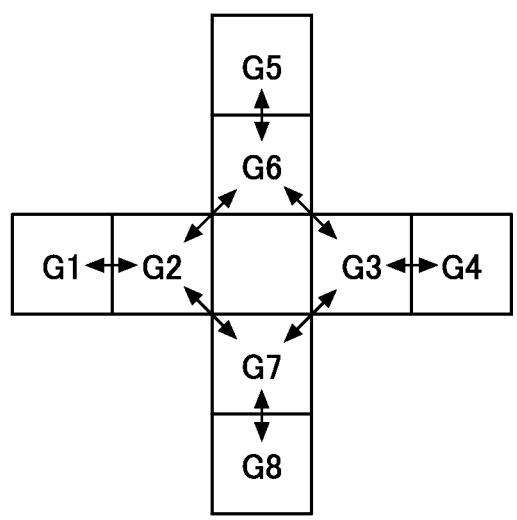
FIG. 11B is a diagram illustrating a distinctive placement of G pixels according to the color filter of FIG. 11A.

When, as illustrated in FIG. 11A, in a mosaic image output from an image pickup device, a 5×5 pixel local region (a region illustrated by the bold frame) centered on the array A is considered in isolation, 8 individual G pixels in this local region are placed in a cross shape as illustrated in FIG. 11B. Taking these G pixels as G1, G2, G3, G4 in sequence from left to right, and as G5, G6, G7, G8 in sequence from top to bottom, then the pixels G1, G2 and the pixels G2, G3 are respectively adjacent in the horizontal direction, the pixels G5, G6 and the pixels G7, G8 are respectively adjacent in the vertical direction, the pixels G6, G3 and the pixels G2, G7 are respectively adjacent in the top left to bottom right diagonal direction, and the pixels G6, G2 and the pixels G3, G7 are respectively adjacent in the bottom left to top right diagonal direction.

Consequently, by deriving the difference absolute values between the pixel values of these adjacent pixels, the direction out of each of the horizontal, vertical and diagonal directions having the smallest change in brightness (the correlation direction with high correlation) can be determined using the smallest pixel separation.

Namely, the sum of the difference absolute values in the horizontal direction is |G1−G2|+|G3−G4|, the sum of the difference absolute values in the vertical direction is |G5−G6|+|G7−G8|, the sum of the difference absolute values in the bottom left to top right diagonal direction is |G6−G2|+|G3−G7|, and the sum of the difference absolute values in the top left to bottom right diagonal direction is |G6−G3|+|G2−G7|.

The correlation (correlation direction) can then be determined as the direction with the smallest difference absolute value out of these four correlation absolute values. Note that the determined correlation direction can be employed during performing processing such as synchronization (interpolation).

Feature (8)

The basic array pattern C configuring the color filter 60 illustrated in FIG. 7 has point symmetry about the center of the basic array pattern C.

As illustrated in FIG. 7, the arrays A and the arrays B in the basic array pattern C are configured with point symmetry about the central R filter or B filter respectively, and also with symmetry (line symmetry) in the up-down and left-right directions.

It is possible to reduce the circuit scale and simplify processing circuits at later stages due to this symmetry.

Note that plural basic array patterns exist that enable configuration of the color filter array illustrated in FIG. 7 by repeatedly disposing the basic array patterns in the horizontal direction and vertical direction. In the present exemplary embodiment, the basic array pattern C that is the basic array pattern with point symmetry is, for convenience, referred to as the basic array pattern.

As illustrated in FIG. 7, sections of the first array pattern A and the second array pattern B of the color filter 60 are contained in Bayer array patterns. For example, when any given 2×2 pixels from the first array pattern A are considered in isolation these are the same as respective 2×2 pixels in the Bayer array pattern illustrated in FIG. 3. This also applies to the second array pattern B.

Consequently, Bayer array pixel data is accordingly also obtained in cases in which the color filter 60 is employed by driving the image pickup device 14 so as to read only pixel data of pixels with the same pattern as the Bayer array pattern. Thinning methods and the like can be executed similarly to in the first to the third exemplary embodiments.

Note that in each of the above exemplary embodiments, although explanation has been given of color filter arrays with color filters for the 3 primary colors RGB, the type of the color filter is not limited thereto.

What is claimed is:

1. An imaging apparatus comprising:

an image pickup device comprising a plurality of photoelectric conversion elements arrayed in a horizontal direction and a vertical direction;

a color filter that is provided above a plurality of pixels configured by the plurality of photoelectric conversion elements, the color filter having repeatedly disposed 6×6 pixel basic array patterns configured with a first array pattern and a second array pattern disposed symmetrically about a point, wherein the first array pattern is disposed on 3×3 pixels containing a portion of a Bayer array pattern disposed with a first filter corresponding to a first color that contributes most to obtaining a brightness signal placed on 2 pixels on one diagonal of a 2×2 pixel square array, and a second filter corresponding to a second color different from the first color and a third filter corresponding to a third color different from the first color and the second color respectively placed on 2 pixels of the other diagonal, and wherein the second array pattern has the same placement of the first filter as that in the first array pattern and has the placement of the second filter and the placement of the third filter swapped over to that of the first array pattern;

a drive section that drives the image pickup device so as to read pixel data from the image pickup device only of pixels at a predetermined position so as to give the same pattern as the Bayer array pattern; and a generating section that, based on the pixel data of the Bayer array pattern output from the image pickup device, for each pixel generates pixel data for each color for each of the pixels by interpolating pixel data for colors other than the corresponding color from pixel data of peripheral pixels.

2. The imaging apparatus of claim 1, wherein:

the color filter is a color filter having repeatedly disposed 6×6 pixel basic array patterns configured with a first array pattern and a second array pattern disposed symmetrically about a point;

the first array pattern has the first filter placed at the 4 corner and center pixels of a 3×3 pixel square array, the second filter placed in a line at the horizontal direction center of the square array, and the third filter placed in a line at the vertical direction center of the square array; and the second array pattern has the same placement of the first filter as that in the first array pattern and has the placement of the second filter and the placement of the third filter swapped over to that of the first array pattern.

3. The imaging apparatus of claim 1, wherein:

the color filter is a color filter having repeatedly disposed 6×6 pixel basic array patterns configured with a first array pattern and a second array pattern disposed symmetrically about a point;

the first array pattern has the third filter placed on pixels at the 4 corners of a 3×3 pixel square array, the second filter placed on the pixel at the center of the square array, and the first filter placed in a line at the vertical direction center and in a line at the horizontal direction center of the square array; and the second array pattern has the same placement of the first filter as that in the first array pattern and has the placement of the second filter and the placement of the third filter swapped over to that of the first array pattern.

4. The imaging apparatus of claim 1, wherein the first color is green (G), the second color is one color of red (R) or blue (B), and the third color is the other color of red (R) or blue (B).

5. A non-transitory storage medium storing an image capture program that causes a computer to execute processing function as a control section configuring the imaging apparatus of claim 1.

* * * * *